(No Model.)
J. T. SWANDER.
REFRIGERATOR DAIRY CAN.
No. 359,985. Patented Mar. 22, 1887.
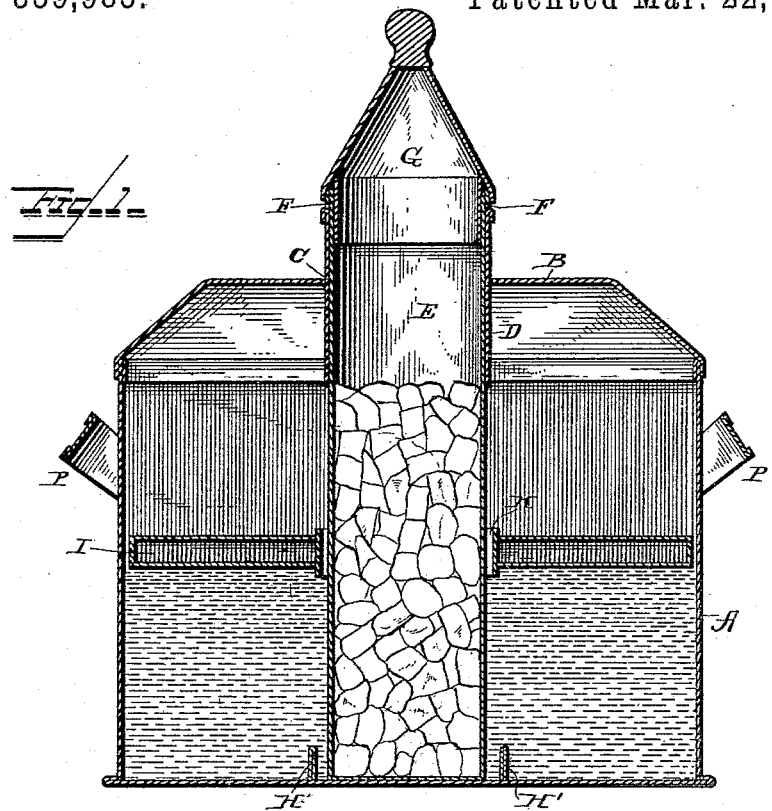
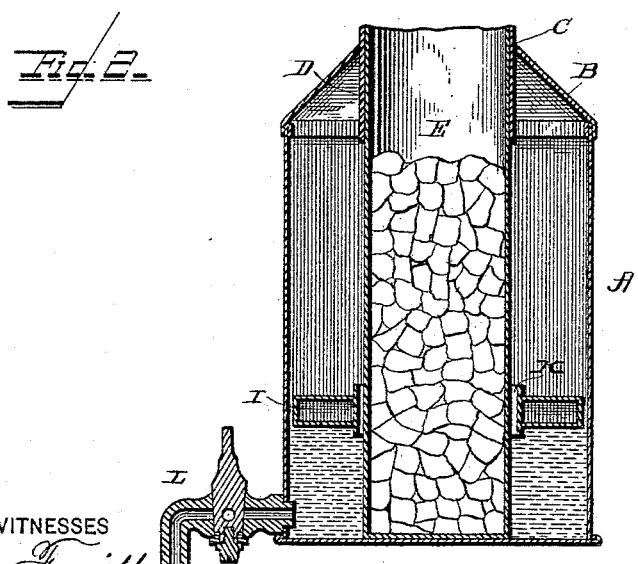
WITNESSES
INVENTOR
John T. Swander
by Anderson & Smith
ATTORNEYS

UNITED STATES PATENT OFFICE.

JOHN T. SWANDER, OF LIMA, OHIO.

REFRIGERATOR DAIRY-CAN.

SPECIFICATION forming part of Letters Patent No. 359,985, dated March 22, 1887.

Application filed August 10, 1886. Serial No. 210,540. (No model.)

*To all whom it may concern:*

Be it known that I, JOHN T. SWANDER, a citizen of the United States, residing at Lima, in the county of Allen and State of Ohio, have invented certain new and useful Improvements in Refrigerator Dairy-Cans; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of my invention and is a vertical longitudinal section. Fig. 2 is a vertical cross-section of the same.

My invention relates to dairy-cans used in the transportation of milk; and it consists in the construction and novel combination of parts, as hereinafter described, and pointed out in the claim.

The object of the invention is to provide a dairy-can with a removable ice-chamber and with a float that will prevent the milk from churning while in transportation, thereby producing a non-churning refrigerating dairy-can.

Referring by letter to the accompanying drawings, A designates the body of the dairy-can, which is preferably rectangular in form.

The can is provided with a fixed top, B, said top being provided with a central filling-aperture, C, which consists of a short pipe, D, which is open at both ends and is soldered in place in the top B, and extends both above and below said top B. The pipe D forms the support for the ice-receptacle E. This ice-receptacle E is tubular in form and is closed at its bottom, and is provided with an external flange, F, around its mouth, which flange F rests upon the upper edge of the filling-tube C when the ice-receptacle is in place in the can. The ice-receptacle E is provided with a removable cover, G, so that said receptacle may be filled with ice when necessary, and may be emptied when the ice has melted.

Upon the upper face of its bottom the can A is provided intermediately of its ends with two vertically-projecting transverse ribs, H H', which extend up a short distance from the bottom of the can and form supports for the hollow sheet-metal float I to rest on when the can is empty, or nearly so. This float I is rectangular in form and has a central opening, K, made through it, and through this opening K the ice-receptacle extends and permits the float to rise and fall with the surface of the milk in the can, in order to prevent the milk from churning while the can is being transported from place to place.

The can A is provided with a draw-off cock, L, through which the milk is drawn in dispensing it for use. The body of the can A is also provided at its ends with handles P P, whereby the can may be readily handled.

Having described this invention, what I claim, and desire to secure by Letters Patent, is—

The combination, with the body of the can provided with the fixed top having the short filling-pipe therein, the vertical transverse ribs upon its bottom, and the draw-off cock between said transverse ribs, of the hollow float provided with the central aperture and the covered flanged ice-receptacle supported by the filling-pipe, substantially as specified.

In testimony whereof I affix my signature in presence of two witnesses.

JOHN T. SWANDER.

Witnesses:
T. W. MOWEN,
FRANK E. MEAD.